Feb. 21, 1928.
G. M. THOMSON
1,660,280
PROCESS FOR THE PRODUCTION OF POROUS BUILDING MATERIAL
Filed Aug. 10, 1926
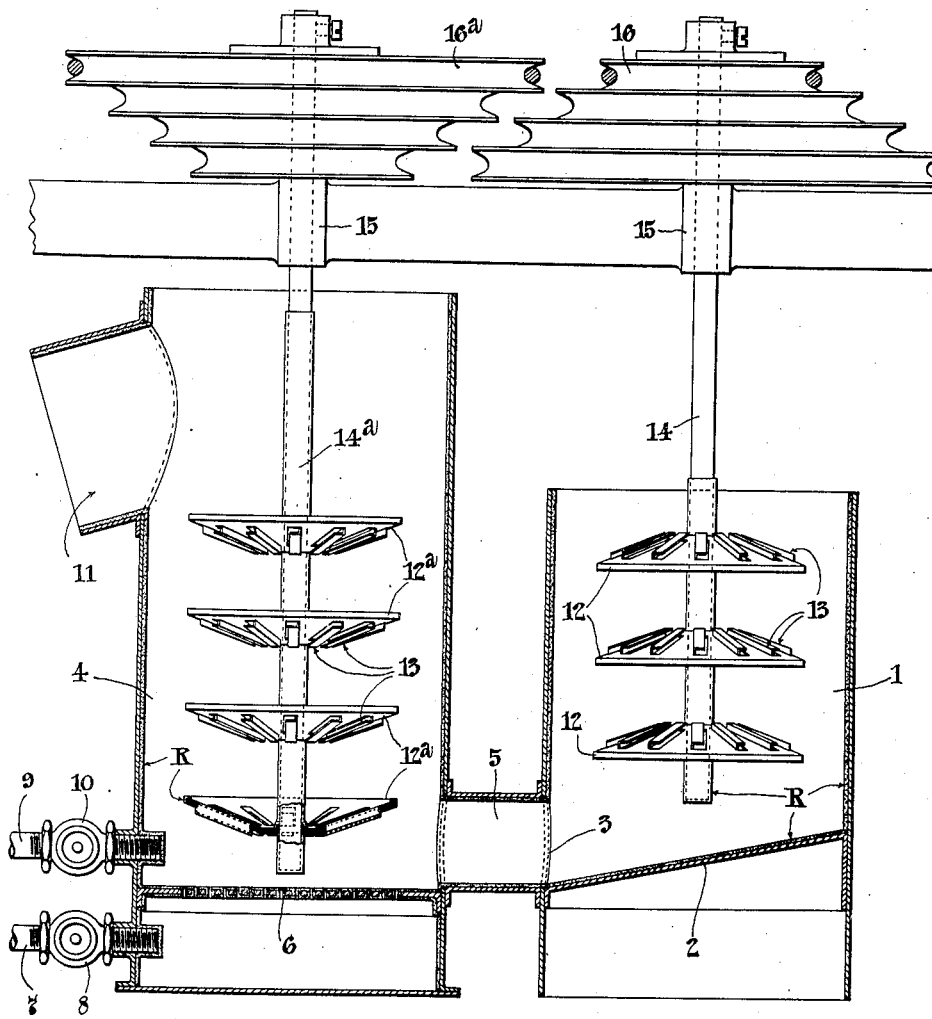
GEORGE MILLER THOMSON
INVENTOR
BY  Marks & Clerk
ATTORNEYS.

Patented Feb. 21, 1928.

1,660,280

UNITED STATES PATENT OFFICE.

GEORGE MILLER THOMSON, OF CALEDONIA, ONTARIO, CANADA, ASSIGNOR TO PENNSYLVANIA GYPSUM COMPANY, OF CHESTER, PENNSYLVANIA, A CORPORATION OF DELAWARE.

PROCESS FOR THE PRODUCTION OF POROUS BUILDING MATERIAL.

Application filed August 10, 1926. Serial No. 128,503.

This invention relates to process for the production of porous building material.

In an application, filed simultaneously herewith, and entitled "Process and apparatus for the production of porous building material", I have fully described and claimed an apparatus, the structure of which is also disclosed herein.

In the treatment of quick-setting materials, such as plaster of Paris, it has been found that crystallization occurs at eddies or points of flow interruption. Such occurrences cause an acceleration of the setting of the plaster of Paris coming in contact with the crystals formed and an accelerated accumulation of wet plaster of Paris or gypsum occurs and may interfere with the continuous operation of such a process as is defined in my application above mentioned.

The object of this invention is to provide means for obviating such a condition, to prevent the attachment of such crystals to any part of the apparatus, so as to avoid the acceleration of the setting and the accumulation of material at such points.

In other words, the object of the invention is to prevent the obstruction of the continuous operation of the process of producing porous building material by preventing premature crystallization of the materials during their treatment.

Briefly stated the invention consists in mixing the material with water and agitating the mixture to effect hydration, in such a manner as to prevent crystallization of particles of the hydrated material within the mixing and agitating zones. To prevent such crystallization I cover or coat the internal faces of all stationary portions of the apparatus, in contact with the material under treatment, with a resilient material, to which crystals will not readily adhere, owing to movement or vibration of the resilient material, caused by the flowing material and/or the jarring or vibration of the apparatus in operation. Such covering or coating may also be applied to the moving parts of the apparatus which come in contact with the wet material.

In the accompanying drawing illustrating the invention, one form of apparatus is shown in sectional elevation.

The mixing chamber 1, having a sloping bottom 2, leading to the outlet 3 is connected to the gas mixing chamber 4 by means of a pipe 5. An inclined chute 11 leads from the gas mixing chamber 4. The shafts 14 and $14^a$, journalled at 15, are driven by pulleys 16 and $16^a$, respectively and have hollow conical impeller wheels 12 and $12^a$ mounted thereon. 13 represents radial blades or vanes, stamped, pressed or otherwise formed in the impeller wheels. The pipe 7 having a valve 8 enters the chamber 4 at a point below a perforated partition 6 and the pipe 9 having a valve 10 at a point above the partition 6.

The inside walls of the chambers 1 and 4 as well as the connecting pipe 5 and chute 11 are covered, coated or lined with a resilient material R as indicated. While the tendency for crystals to cling to the moving parts 14, $14^a$, 12, $12^a$ and 13 is much less than to the other parts, with rapid-setting materials, seeding or premature crystallization may take place at a point on such moving parts and in such cases it is desirable to cover these parts as well.

A resilient material such as relatively soft rubber or a cork base covered with rubber is used to line or coat the apparatus in the manner indicated. The essential characteristic required in the lining is, as previously indicated, that of resiliency or adaptability to vibrate under the influence of stresses incident to the operation of the apparatus. This property of the lining or coating applied to the apparatus prevents the adherence of crystals, which form prematurely in the operation of the process, and thus the so-called crystal seeding is not permitted to cause an acceleration of the setting, or accumulation of the wet material at or on points of the apparatus.

The operation of the apparatus is as follows:

The quick-setting cementitious material is mixed with water in the chamber 1, to form a slurry. From this chamber the slurry flows into the agitating zone in chamber 4, where the slurry is thoroughly agitated to hydrate the material. The resilient lining of these chambers and coating on the moving parts prevent the crystallization of particles of the material, within the mixing and agitating zones, as previously described. It will be apparent that the wetting of the lining and coating by the slurry assists in this regard.

While means are shown for producing porosity in the plastic mass, this feature is not part of the present invention and need not be described in detail herein.

It should be stated that the use of a substance to act as a retarder of the setting of the material, such as is well known and generally used in the art, is avoided in the practice of this invention, inasmuch as the addition to these quick-setting materials of foreign substances of the retarder class tends to lower the ultimate strength of products made therefrom. The addition of retarders effects the normal setting qualities of the material and it is not uncommon for seeding to occur within the agitating zone when retarders are used, whereas in accordance with this invention the crystallization of the material within the zone of agitation is prevented, without in any way affecting the normal setting qualities of the material.

I claim:

1. The method of producing a plastic mass of quick-setting cementitious material, which consists in agitating such material in a given zone of agitation, and preventing the crystallization of particles of the material within the zone of agitation while maintaining the normal setting properties of the material.

2. A method of producing a plastic mass of quick-setting cementitious material, which consists in mixing the material with water to form a slurry, agitating the slurry in a zone of agitation, and preventing crystal seeding during mixing and within the zone of agitation while maintaining the normal setting properties of the material as herein described.

3. In a method of hydrating quick-setting cementitious materials in which the material is mixed with water and agitated in a zone, the step which comprises preventing the formation of crystals of the material within the zone of agitation while maintaining the normal setting properties of the material.

4. In a method of agitating slurry containing quick-setting material in an agitating zone, the step which comprises inhibiting crystal growth on the faces of the agitator in contact with the slurry while maintaining the normal setting properties of the material.

5. The method of producing a plastic mass of quick-setting cementitious material, which consists in agitating such material in a given zone of agitation, and preventing the crystallization of particles of the material within the zone of agitation during agitation while maintaining the normal setting qualities of the material.

6. The method of treating a slurry of quick-setting cementitious material, which consists in agitating such material in a given zone of agitation, and preventing the crystallization of particles of the material within the zone of agitation while maintaining the normal setting properties of the material.

7. The method of treating a slurry of quick setting calcined gypsum, which consists in agitating such material in a given zone of agitation, and preventing the crystallization of particles of the material within the zone of agitation while maintaining the normal setting properties of the material.

8. The method of treating a slurry of quick setting calcined gypsum, which consists in agitating such material in a given zone of agitation, and preventing the crystallization of particles of the material within the zone of agitation during agitation while maintaining the normal setting qualities of the material.

9. The method of treating a slurry of quick-setting calcined gypsum which comprises agitating the slurry in a zone of agitation and inhibiting the crystallization of the gypsum within said zone during agitation while maintaining the normal setting qualities of the gypsum.

10. The process of inhibiting the crystallization of quick-setting material during the agitation of a slurry thereof in an agitating zone bounded by a resilient material, which comprises producing resilient agitation effect upon said slurry at the boundaries of said zone.

11. The process of inhibiting the crystallization of quick-setting material during the agitation of a slurry thereof in an agitating zone bounded by rubber, which comprises producing resilient agitation effect upon said slurry at the boundaries of said zone.

In testimony whereof I affix my signature.

GEORGE MILLER THOMSON.